L. BRYANT.
TRACTOR CULTIVATOR.
APPLICATION FILED OCT. 24, 1917.
1,359,868.
Patented Nov. 23, 1920.
4 SHEETS—SHEET 2.
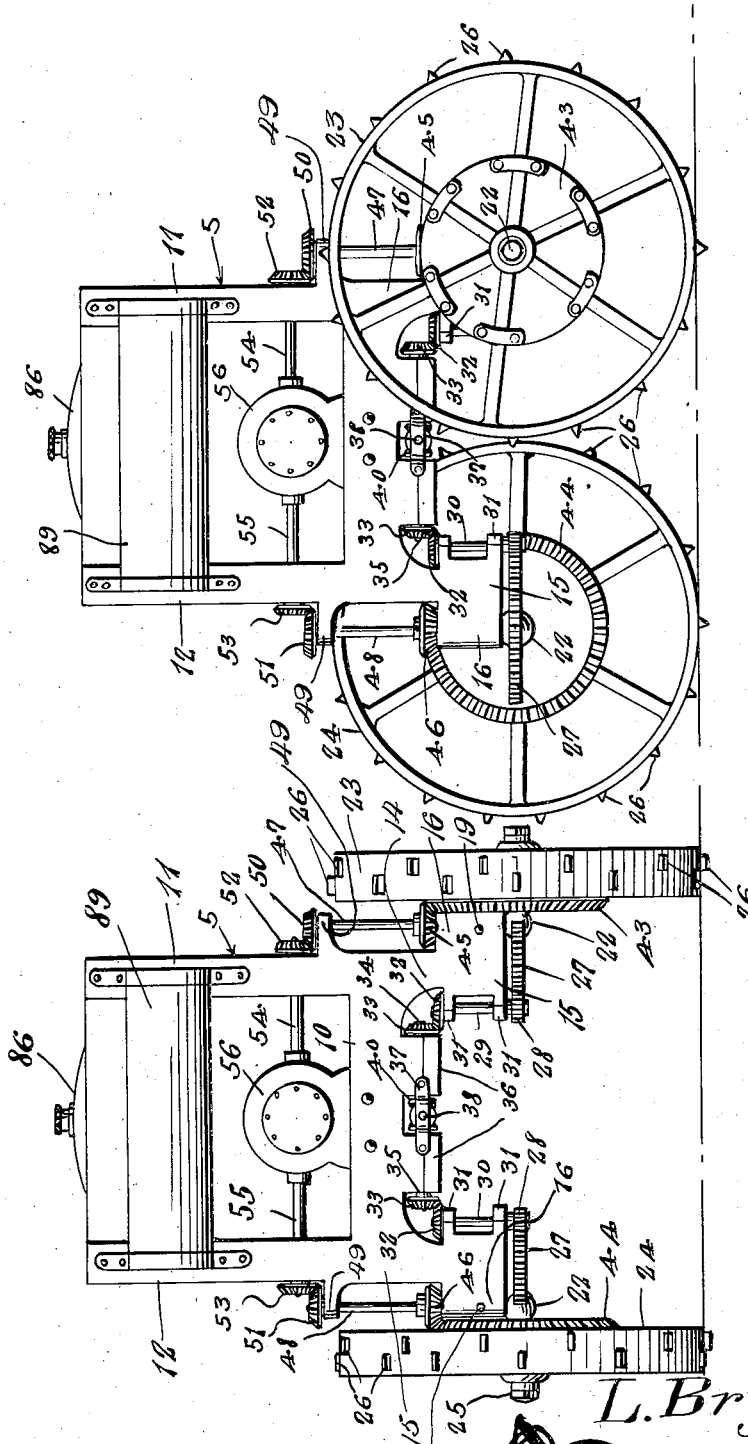

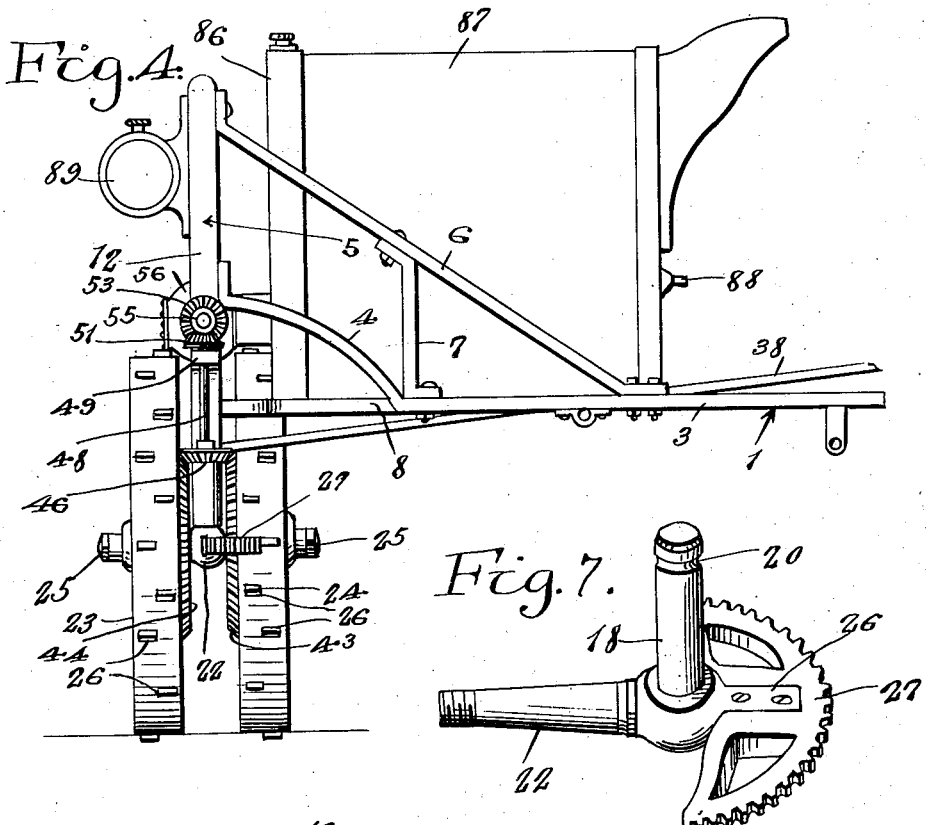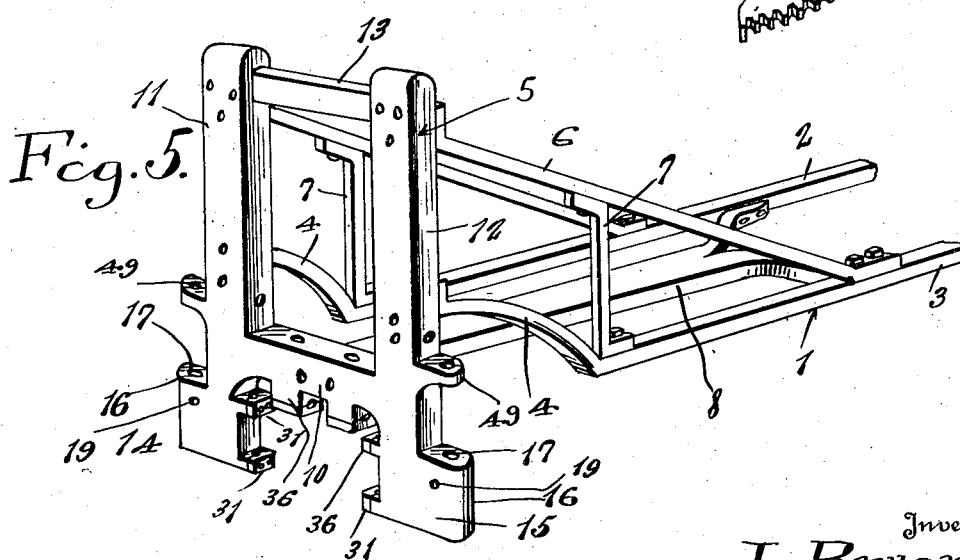

L. BRYANT.
TRACTOR CULTIVATOR.
APPLICATION FILED OCT. 24, 1917.
1,359,868.
Patented Nov. 23, 1920.
4 SHEETS—SHEET 4.
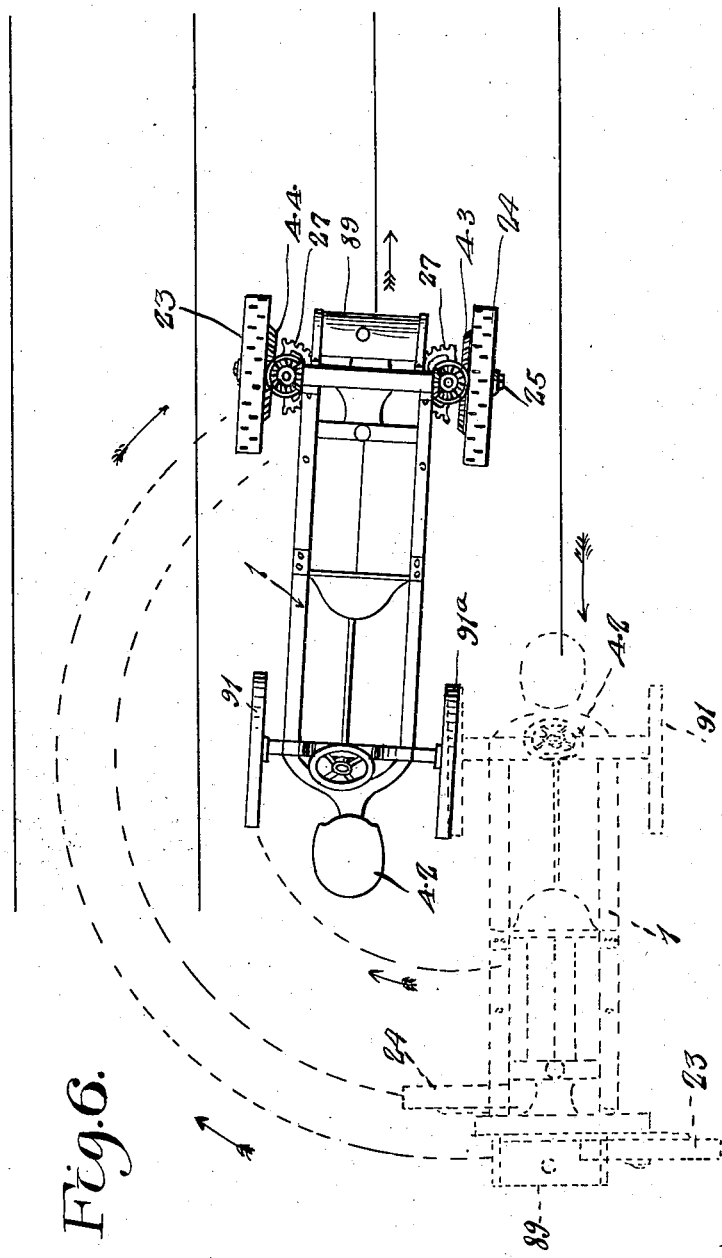

UNITED STATES PATENT OFFICE.

LAWYER BRYANT, OF LA GRANGE, NORTH CAROLINA.

TRACTOR-CULTIVATOR.

1,359,868. Specification of Letters Patent. Patented Nov. 23, 1920.

Application filed October 24, 1917. Serial No. 198,212.

*To all whom it may concern:*

Be it known that I, LAWYER BRYANT, a citizen of the United States, residing at La Grange, in the county of Lenoir and State of North Carolina, have invented certain new and useful Improvements in Tractor-Cultivators; and I do hereby declare the following to be a full, clear, and exact description of the invention, such as will enable others skilled in the art to which it appertains to make and use the same.

This invention relates to tractor cultivators, and more particularly to a tractor structure designed particularly for use in connection with cultivating implements, but which may be employed for drawing any suitable type of agricultural implements or other analogous device and the primary object of the invention is to provide a tractor which is capable of turning upon one of its rear wheels as a pivot for making a short turn at the end of a row of plants being cultivated.

More specifically, an object of the invention is to provide a tractor in which the front wheels are driven from the engine or prime mover while the rear wheels trail, and to provide a steering mechanism by means of which the front propelling wheels may be turned at right angles to the frame of the tractor, for causing the tractor to turn upon one of its rear wheels as a pivot and also to provide means for transmitting the power from the engine or prime mover to the front propelling wheels which means will operatively connect the front guiding wheels to the engine at any angle of their adjustment.

A further object of the invention is to provide a front axle structure which has end portions depending therefrom which vertical portions of the axle rotatably support vertical stub-shafts which are connected to the wheel carrying spindle, and further to mount segmental gears upon the inner ends of the wheel carrying spindles which segmental gears mesh with pinions that are operatively connected to an ordinary steering post and wheel.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views and in which:

Fig. 2 is a front elevation of the tractor.

Fig. 3 is a front elevation of the tractor showing the front guiding wheels turned at right angles to the tractor.

Fig. 4 is a fragmentary side elevation of the tractor showing the front guiding wheels in a turned position as illustrated in Fig. 3.

Fig. 5 is a fragmentary perspective view of a part of the frame construction of the tractor.

Fig. 6 is a diagrammatic plan view illustrating the manner of turning the tractor.

Fig. 7 is a detail perspective view of one of the front wheel supporting spindles and associated parts.

Figure 1:
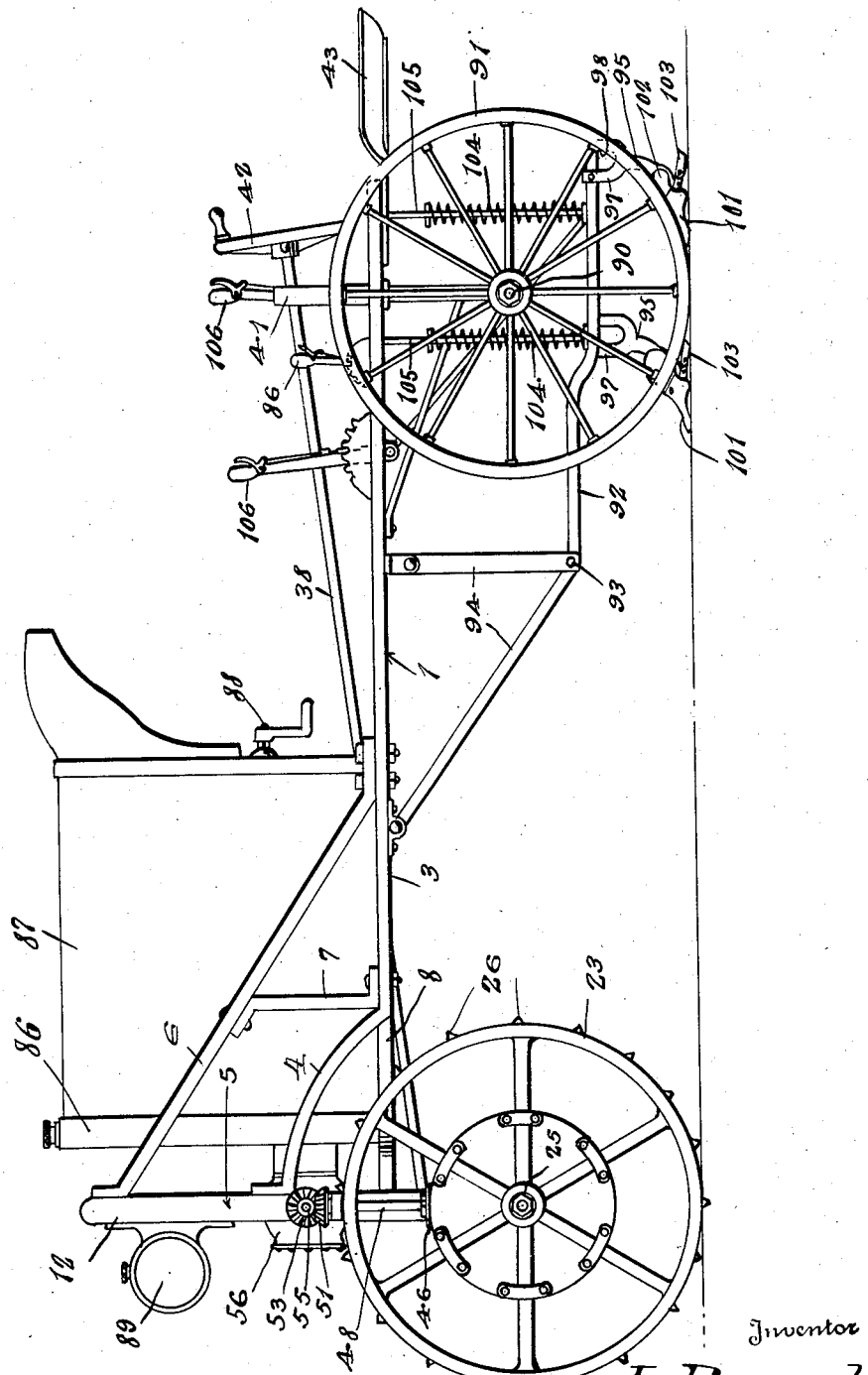
Figure 1 is a side elevation of the improved tractor cultivator.

Referring more particularly to the drawings, 1 indicates the supporting structure of the tractor which includes side rails 2 and 3. The side rails 2 and 3 have their forward ends bowed or curved upwardly as shown at 4 and attached to the rear surface of the front axle structure indicated by the numeral 5. The side rails 2 and 3 are braced by suitable braces 6 which are in turn braced by suitable braces 7 and the side rails are also braced by a bracing structure 8.

The front axle structure 5 is made of a single casting and it comprises the horizontal portion 10 which has a pair of upstanding arms 11 and 12 formed thereupon in spaced relation to each other so that the side rails 2 and 3 are attached to the rear surfaces of these upstanding arms. The upper ends of the arms 11 and 12 are braced by a suitable cross brace 13. The front axle structure 5 also includes a pair of downwardly extending portions 14 and 15 which extend downwardly from the ends of the horizontal portions 10.

Bosses or outstanding portions 16 are formed upon the vertical portions 14 and 15 and they are provided with vertical bores 17. The vertical bores 17 rotatably receive the upstanding stub shaft 18 and the stub shafts are held against vertical movement within the bores 17 by pins 19 which ride in annular grooves 20 formed in the shafts 18 near their upper ends.

The vertical stub shafts 18 are formed on or carried by the steering wheel supporting spindles 22 which spindles have drive wheels 23 and 24 mounted thereon and held against movement longitudinally of the spindles by the usual type of nuts 25. The wheels 23 and 24 preferably have a plurality of cleats or grouters 26 carried by the periphery thereof for biting into the surface over which the tractor is traveling.

The spindle structures 22 have arms 26 formed thereupon which project oppositely to the center of the shaft 18 from the spindle, as clearly shown in Fig. 7 of the drawings. The arms 26 have segmental gears 27 carried thereby, of substantially semi-circular shape concentric with the vertical shaft 18 at their axis. The gears 27 are horizontally disposed and are positioned beneath the vertical portions 14 and 15 and the bosses 16, and pinions 28 mesh therewith. The pinions 28 are secured upon the lower ends of vertical shafts 29 and 30 which shafts are carried by suitable bearings 31 formed upon the inner facing edges of the vertical portions 14 and 15. Beveled gears 32 are mounted upon the upper ends of the shafts 29 and 30 and they mesh with beveled gears 33 that are mounted upon the ends of shafts 34 and 35. The shafts 34 and 35 are rotatably supported by bearings 36 which depend from the under surface of the horizontal portion 10 of the axle structure 5. The bearings 36 have their inner ends spaced, and a strap 37 extends across this space forming a support for one end of a shaft 38. The shafts 34 and 35 are operatively connected to the shaft 38 through the medium of the beveled gears as indicated at 40 in Figs. 2 and 3 of the drawing. The steering post 38 extends rearwardly from the front axle structure 5, and is supported near its rear end by a suitable supporting structure 41. An ordinary hand wheel 42 is mounted upon the rear end of the steering post 38 and it is positioned so that it may be conveniently reached by the operator of the machine riding upon the seat structure 43. The seat structure 43 is of the usual type commonly employed in agricultural implements, and it is supported rearwardly from the rear end of the supporting frame 1 of the tractor.

The steering of the tractor is controlled through the rotation of the steering post 38 through the medium of the shafts 34 and 35 and 29 and 30, and the pinions 28 which mesh with the segmental racks 27, that are carried by the spindle structure 22 so that if it is desired to turn the tractor in a short space, the wheels 23 and 24 may be moved at right angles to the direction in which the tractor has been traveling, as shown in Figs. 3, 4 and 6 for making a very short turn.

The wheels 23 and 24 have relatively large beveled gears 43 and 44 attached thereto which beveled gears mesh with beveled pinions 45 and 46. The beveled pinions 45 and 46 are carried by vertical shafts 47 and 48, respectively, which shafts are rotatably supported by suitable bearing lugs 49 formed upon the upstanding arms 11 and 12 of the front axle structure 5. Beveled gears 50 and 51 are mounted upon the upper ends of the shafts 47 and 48, respectively, and they mesh with beveled gears 52 and 53 respectively. The beveled gear 52 is mounted upon a shaft 54, while the beveled gear 53 is mounted upon a shaft 55. These shafts form a part of an ordinary differential gear structure commonly employed in automobiles which is inclosed in the differential casing 56 and is associated with an ordinary type of transmission.

A control lever 86 is located adjacent the seat 43 and may be connected to the transmission so that the operator may easily control the driving action on the wheels 23.

Any suitable type of gasolene or kerosene engine may be employed for driving the tractor and it is inclosed in a hood 87 of the ordinary construction which has an ordinary radiator 86 carried by the forward end of the same for cooling the water which is employed for cooling the engine. The crank of the engine is indicated at 88 in Fig. 1 of the drawings and a gasolene or other volatile fuel supply tank is indicated at 89 in the drawings, this tank being carried by the upstanding arms 11 and 12 of the front axle structure 5.

The supporting frame 1 of the tractor has a rear axle 90 carried thereby upon which are mounted the rear supporting wheels 91 of the tractor cultivator. The wheels 91 are not connected to the engine and they simply trail the front propelling wheels 23 and 24.

The cultivator structure which is carried by the tractor comprises the usual type of cultivator beams 92 which are pivotally connected as shown at 93 to a suitable frame structure 94, each beam being provided with a standard 95 attached thereto. The standards 95 have their upper ends formed to provide a pair of arms 97 and 98, which are secured to the beam in any suitable or preferred manner.

The cultivating shovel structure which is carried by the lower end of the standard 95 comprises a point 101 which is attached to the toe of the standard 95, and a relatively small mold board 102. The mold boards 102 curve outwardly and upwardly from the points 101 for guiding the dirt outwardly, so as to assure the efficient stirring thereof. Suitable sweep blades 103 may be attached to the standards 95 for cutting weeds, grass or the like.

The cultivating shovel structures are particularly designed for thoroughly cultivating corn or any analogous growing crop and to completely kill off the weeds, grass or the like which might be growing about the corn or other agricultural products.

The standards 92 are held downwardly by coil springs 104 which are coiled about and supported by rods 105. The springs 104 yieldingly hold the beams 92 downwardly for holding the cultivating shovels in proper ground engaging position.

Suitable hand levers 106 are provided for raising or lowering the beams 92 into or out of operative position.

While in the foregoing description, the tractor has been described as applicable for use as a cultivator, it is to be understood that it may be employed for drawing any suitable type of agricultural implements or any type of vehicles, if it is so desired without departing from the spirit of this invention.

From the foregoing description taken in connection with the accompanying drawings the advantages of construction and the method of operation of the improved tractor cultivator will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What I claim as new is:—

1. A tractor construction comprising a horizontal member, vertical members formed integrally with the ends of said horizontal member and extending above and below the same, means connecting the upper ends of the vertical members, side members lying in a plane with the horizontal member and having their forward portions curved upwardly and secured to the vertical members above the horizontal member, braces secured to the vertical members adjacent their upper ends and to the side members rearwardly of their curved portions, braces secured to said first braces and to the side members, and a single brace having one end bifurcated and secured to the side members and having its other end secured to the horizontal member.

2. A tractor construction comprising a horizontal member, vertical members formed integrally with the ends of said horizontal member and extending above and below the same, means connecting the upper ends of the vertical members, side members lying in a plane with the horizontal member and having their forward portions curved upwardly and secured to the vertical members above the horizontal member, braces secured to the vertical members adjacent their upper ends and to the side members rearwardly of their curved portions, braces secured to said first braces and to the side members at their curved portions, a single brace having one end bifurcated and secured to the side members adjacent the attachment of the first named braces thereto and having its other end secured to the horizontal member, and bearings formed on the inner and outer faces of the vertical members and the bottom face of the horizontal member for supporting driving and steering shafts of tractor wheels.

In testimony whereof I affix my signature in presence of two witnesses.

LAWYER BRYANT.

Witnesses:
T. H. WORD,
JOHN W. SMITH.